US007726921B2

(12) United States Patent
Lombardi et al.

(10) Patent No.: US 7,726,921 B2
(45) Date of Patent: Jun. 1, 2010

(54) STANCHION CONTAINMENT SYSTEM

(75) Inventors: Paul J. Lombardi, St. Cloud, MN (US);
Steven T. Dorsey, St. Joseph, MN (US)

(73) Assignee: McNally Industries, LLC, Grantsburg, WI (US)

( * ) Notice: Subject to any disclaimer, the term of this patent is extended or adjusted under 35 U.S.C. 154(b) by 514 days.

(21) Appl. No.: 11/612,867

(22) Filed: Dec. 19, 2006

(65) Prior Publication Data
US 2007/0140807 A1   Jun. 21, 2007

Related U.S. Application Data

(60) Provisional application No. 60/751,843, filed on Dec. 20, 2005.

(51) Int. Cl.
*B61D 45/00* (2006.01)
*B60P 7/135* (2006.01)

(52) U.S. Cl. .................. 410/153; 410/144; 410/150; 410/151

(58) Field of Classification Search .......... 410/153, 410/121, 129, 130, 132, 137–139, 142, 144, 410/133; 52/64, 243.1; 248/351
See application file for complete search history.

(56) References Cited

U.S. PATENT DOCUMENTS

| 1,665,439 | A | * | 4/1928 | Brown | 410/153 |
|---|---|---|---|---|---|
| 1,825,452 | A | * | 9/1931 | Harris | 410/137 |
| 3,005,419 | A | * | 10/1961 | Loomis et al. | 410/131 |
| 3,017,843 | A | * | 1/1962 | Loomis et al | 410/131 |
| 3,073,260 | A | * | 1/1963 | Dunlap et al. | 410/124 |
| 3,073,261 | A | * | 1/1963 | Oglesby | 410/131 |
| 3,413,932 | A | * | 12/1968 | Bennett | 410/142 |
| 3,767,253 | A | * | 10/1973 | Kluetsch | 410/118 |
| 5,314,156 | A | * | 5/1994 | Moses | 248/317 |
| 5,472,300 | A | * | 12/1995 | Lipschitz | 410/139 |
| 5,865,580 | A | * | 2/1999 | Lawrence | 410/118 |
| 6,514,022 | B2 | * | 2/2003 | Truckor et al. | 410/138 |
| 6,705,812 | B1 | * | 3/2004 | Benedict et al. | 410/153 |
| 6,749,383 | B1 | * | 6/2004 | Benedict et al. | 410/153 |
| 6,752,575 | B1 | * | 6/2004 | Moore et al. | 410/129 |
| 2008/0131226 | A1 | * | 6/2008 | Pesson | 410/129 |

* cited by examiner

*Primary Examiner*—Patricia L Engle
(74) *Attorney, Agent, or Firm*—Stoel Rives LLP

(57) ABSTRACT

A stanchion containment systems and method for securely storing and for safely accessing large and/or heavy items. The present stanchion containment system is particularly suited for use in dynamic locations. The stanchion assemblies includes a ceiling assembly releasably engaged with holes in the ceiling plate, and a deck assembly releasably engaged with holes in the deck plate. At least one linkage assembly connects the two or more of the stanchion assemblies. The linkage assembly substantially supports the stanchion assembly for translation from a first location to a second location, to provide access to the items.

23 Claims, 9 Drawing Sheets

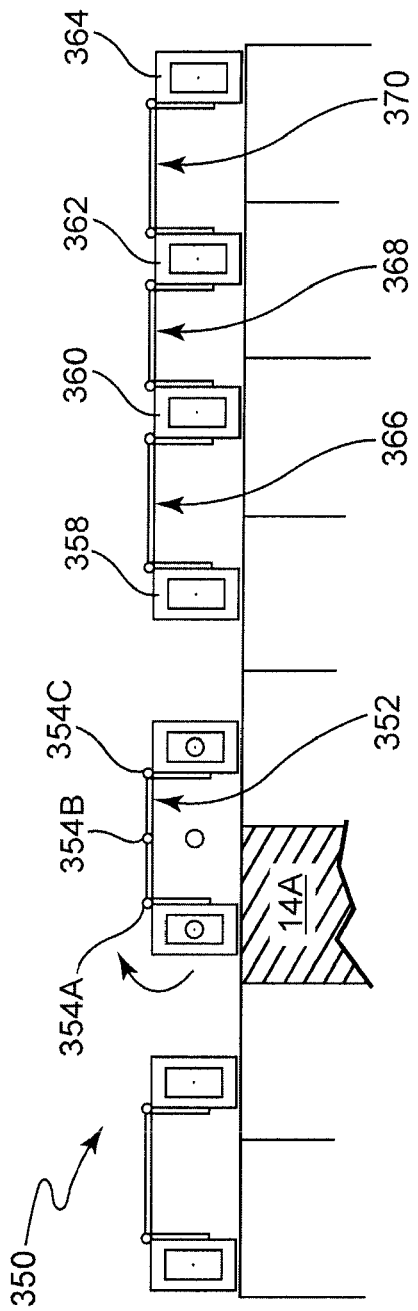
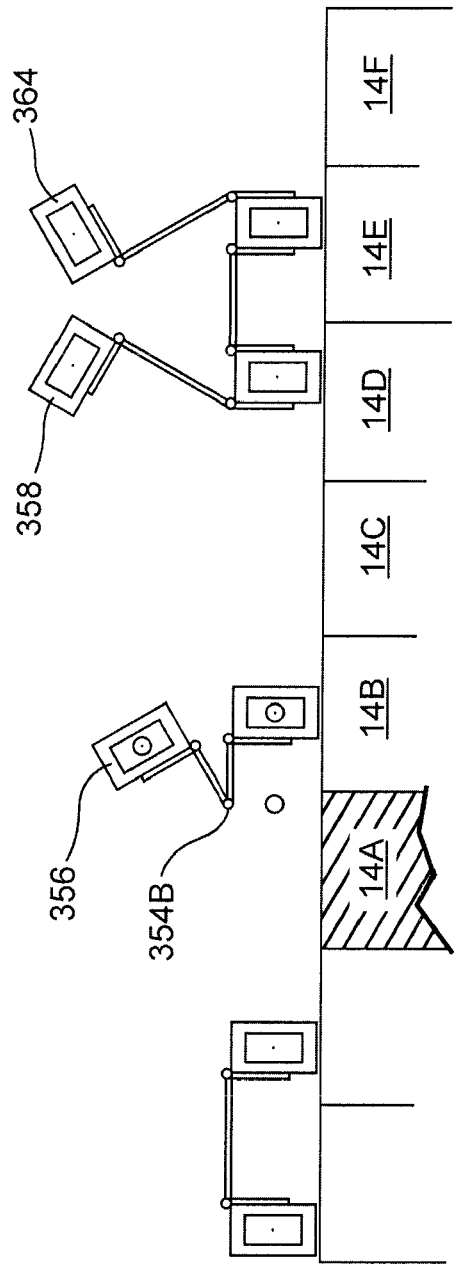
Fig. 8A
Fig. 8B

STANCHION CONTAINMENT SYSTEM

The present application claims the benefit of U.S. Provisional Application No. 60/751,843, filed Dec. 20, 2005, entitled Universal Tie-down Stanchion System, the entire contents of which are hereby incorporated by reference.

FIELD OF THE INVENTION

The present invention generally relates to stanchion containment systems for securing large and/or heavy items in a dynamic location. In particular, the present invention has application for securely storing, and for safely accessing, munitions stored in container columns on a naval vessel.

BACKGROUND OF THE INVENTION

There is a constant need for better ways to securely store, and to safely access, large and/or heavy items. This application is particularly critical when the storage system is located in a dynamic location, such as for example on ships, trains, airplanes, oil rigs at sea, military vehicles, and the like.

One application of interest is securing munitions on naval vessels. Tie-down systems currently used on certain naval vessels includes stanchions that anchor to ceiling plates and deck plates.

The ceiling plate and the deck plate have an aligned pattern of holes that engage with a plunger and/or a latch at the ends of the stanchion assemblies. The stanchions typically include a heavy metal latch that engages with a hole in the deck plate and a sliding plunger at the top end that engages with a hole in the ceiling plate. The plunger and latch on the stanchion permit relative movement of the ceiling and deck plates in response to movement of the ship.

One approach is to use battens extending between H-shaped stanchions. The H-shaped stanchions and battens create a temporary wall that is removed as the munitions are used. Consequently, for some applications there may be no need to move any stanchions for accessing the munitions.

Another approach is to place the stanchions in front of the open ends of a munitions container column, to secure the munitions stowed in the containers. However, for accessing the munitions, the stanchions must be removed and relocated.

The requirement to move and relocate the stanchions presents both a safety and human factors issue. The weight of a rectangular 3"×4" stanchion is approximately 100 pounds which, as defined in MIL-STD-1472F, exceeds the ergonomic allowable lift for a single individual. When the stanchions are moved, they must be placed in a location that permits free movement of the sailors, the handling systems, and the munitions. The stanchions can be relocated to empty holes in the ceiling and deck plates, or laid on the deck. If they are placed on the deck, they can become a potential hazard because they can move with the movement of the ship. If they are placed in another position between the ceiling and deck plates, the ceiling assembly must adequately secure the plunger into the appropriate hole in the ceiling plate to prevent the stanchion from becoming a hazard. In the limited space available, moving the stanchions in a timely manner to accommodate the rate of fire can be difficult given the number of persons required for lifting and moving a stanchion. These moves may have to be repeated depending on the amount and/or type of munitions used.

BRIEF SUMMARY OF THE INVENTION

The present invention relates to a stanchion containment system. The stanchion assemblies can be unlocked from the ceiling and deck plates and relocated to a different position, without the operator being required to physically lift the stanchion assemblies. The modular nature of the invention permits a vast number of configurations. The present stanchion containment system is not limited to tube-type and H-type stanchions and can be used with a variety of stanchion types.

When repositioning stanchion assemblies, most of the weight of the stanchion assemblies is transferred by a linkage system to an adjacent stanchion assembly that is still fixed to the ceiling and deck plates. Once repositioned, the stanchion assembly can be secured to one or both of the ceiling and deck plates.

The linkage assembly can optionally include one or more hinge mechanisms, providing additional axes around which the stanchion assemblies can rotate. A multi-axis embodiment permits the stanchion assemblies to traverse a more complex path than a simple arc. Depending on the length of the connector plate, the stanchion assemblies can be displaced to a variety of alternate locations, and optionally secured to the deck or ceiling plates.

In one embodiment of the invention, the system includes a ceiling plate with a plurality of holes and a deck plate with a plurality of holes generally aligned vertically with holes in the ceiling plate. A plurality of stanchion assemblies is provided. Each stanchion assembly includes a ceiling assembly adapted to releasably engage with the holes in the ceiling plate, and a deck assembly adapted to releasably engage with the holes in the deck plate. At least one linkage assembly connects at least two stanchion assemblies. The linkage assembly permits at least one of the stanchion assemblies to be displaced from a first location to a second location when the ceiling assembly and deck assembly are disengaged from the holes in the ceiling plate and deck plate, respectively. The linkage assembly substantially supports the stanchion assembly during displacement from the first to the second location.

The plurality of stanchion assemblies can be arranged in a generally planar configuration, as a perimeter of an enclosure, or an infinite variety of other configurations.

The stanchion assemblies can be displaced along one or more of a generally circular path, a curvilinear path or a linear path. In some embodiments, at least two stanchion assemblies are displaced.

The linkage assembly can support at least two horizontally displaced stanchion assemblies simultaneously. The linkage assembly can include one or more pivot axes. Linkage assemblies can be provided on each of two adjacent stanchion assemblies. At least a portion of the linkage assembly is preferably releasably attached to the stanchion assemblies. The stanchion assemblies are preferably substantially vertical when engaged with holes in the ceiling and deck plates. In another embodiment, the stanchion assemblies are substantially orthogonal with respect to the ceiling and deck plates.

In another embodiment, the present invention is directed to a first stanchion assembly including a ceiling assembly releasably engaged with the holes in the ceiling plate, and a deck assembly releasably engaged with the holes in the deck plate. A second stanchion assembly includes a ceiling assembly disengaged from the holes in the ceiling plate, and a deck assembly disengaged from the holes in the deck plate. At least one linkage assembly connects the first stanchion assembly to the second stanchion assembly so that the first stanchion assembly and the linkage assembly substantially support the second stanchion assembly for generally horizontal translation from a first location to a second location.

The present invention is also directed to a stanchion containment system anchored to a ceiling plate and a deck plate.

The stanchion containment system includes at least first and second stanchion assemblies. The first stanchion assembly includes a ceiling assembly releasably engaged with holes in the ceiling plate, and a deck assembly releasably engaged with holes in the deck plate. The second stanchion assembly includes a ceiling assembly disengaged from holes in the ceiling plate, and a deck assembly disengaged from holes in the deck plate. At least one linkage assembly connects the first stanchion assembly to the second stanchion assembly. The linkage assembly substantially supports the second stanchion assembly for translation from a first location to a second location.

The present invention is also directed to a method for anchoring a stanchion containment system between a ceiling plate and a deck plate. The method includes releasably engaging a ceiling assembly on a first stanchion assembly with holes in the ceiling plate, and releasably engaging a deck assembly on the first stanchion assembly with holes in the deck plate. A second stanchion assembly is located proximate the first stanchion assembly. The first stanchion assembly is connected to the second stanchion assembly. The ceiling assembly on the second stanchion assembly is disengaged from the holes in the ceiling plate, and the deck assembly on the second stanchion assembly is disengaged from the holes in the deck plate. The first stanchion assembly substantially supports the second stanchion assembly. The second stanchion assembly is displaced from a first location to a second location.

In one embodiment, a third stanchion assembly is connected to the second stanchion assembly by a linkage assembly. The second and third stanchion assemblies can be simultaneously displaced from a first location to a second location. At least one of the ceiling assembly or the deck assembly on the displaced stanchion assemblies are preferably engaged with holes in one of the ceiling plate or the deck plate.

BRIEF DESCRIPTION OF THE SEVERAL VIEWS OF THE DRAWING

FIG. 8A is an alternate stanchion containment system in accordance with an embodiment of the present invention.

FIG. 8B illustrates the stanchion containment system of FIG. 8A in an open configuration in accordance with an embodiment of the present invention.

DETAILED DESCRIPTION OF THE INVENTION

Figure 1:
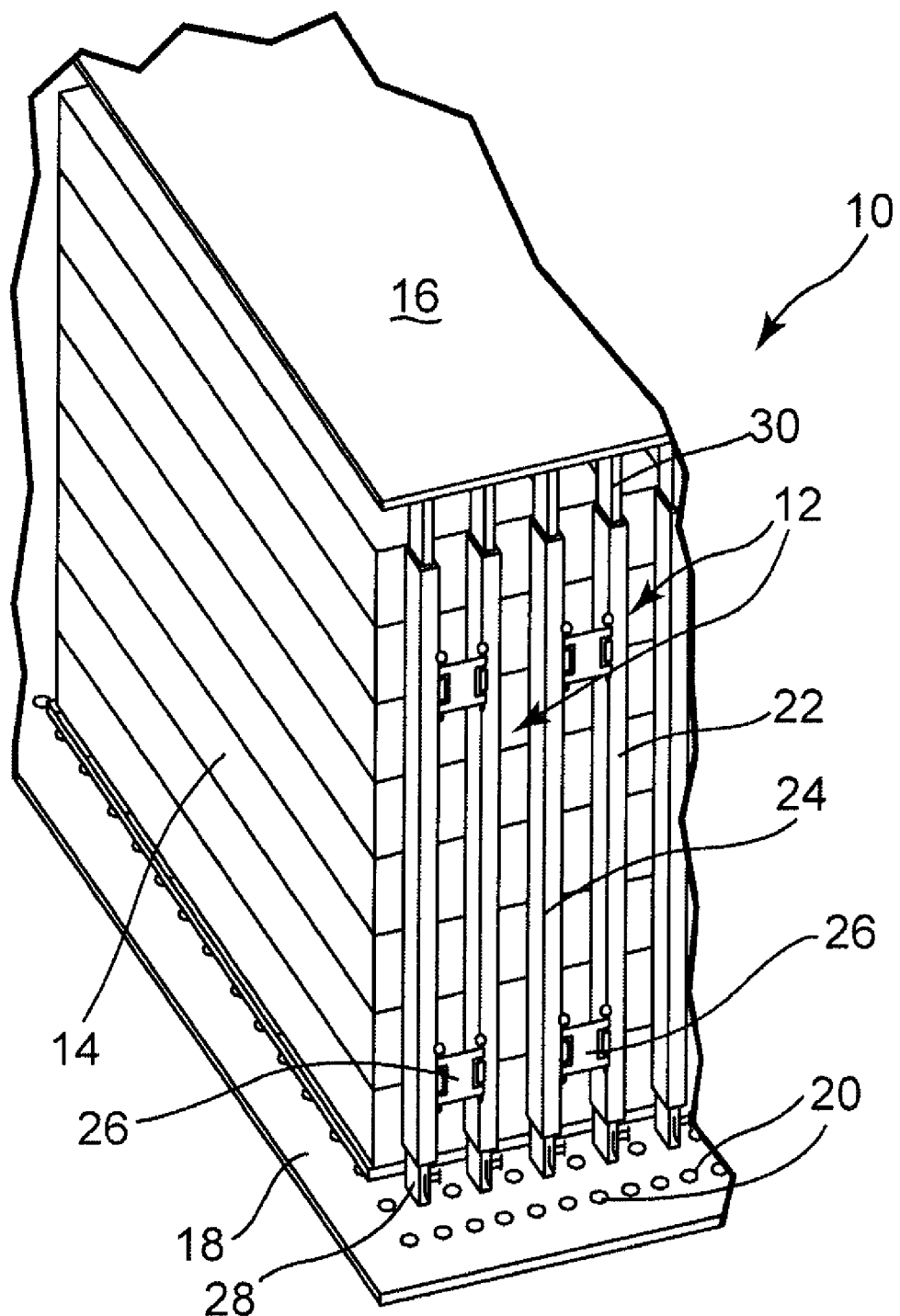
FIG. 1 is a perspective view of a stanchion containment system in according with an embodiment of the present invention.
Figure 6:
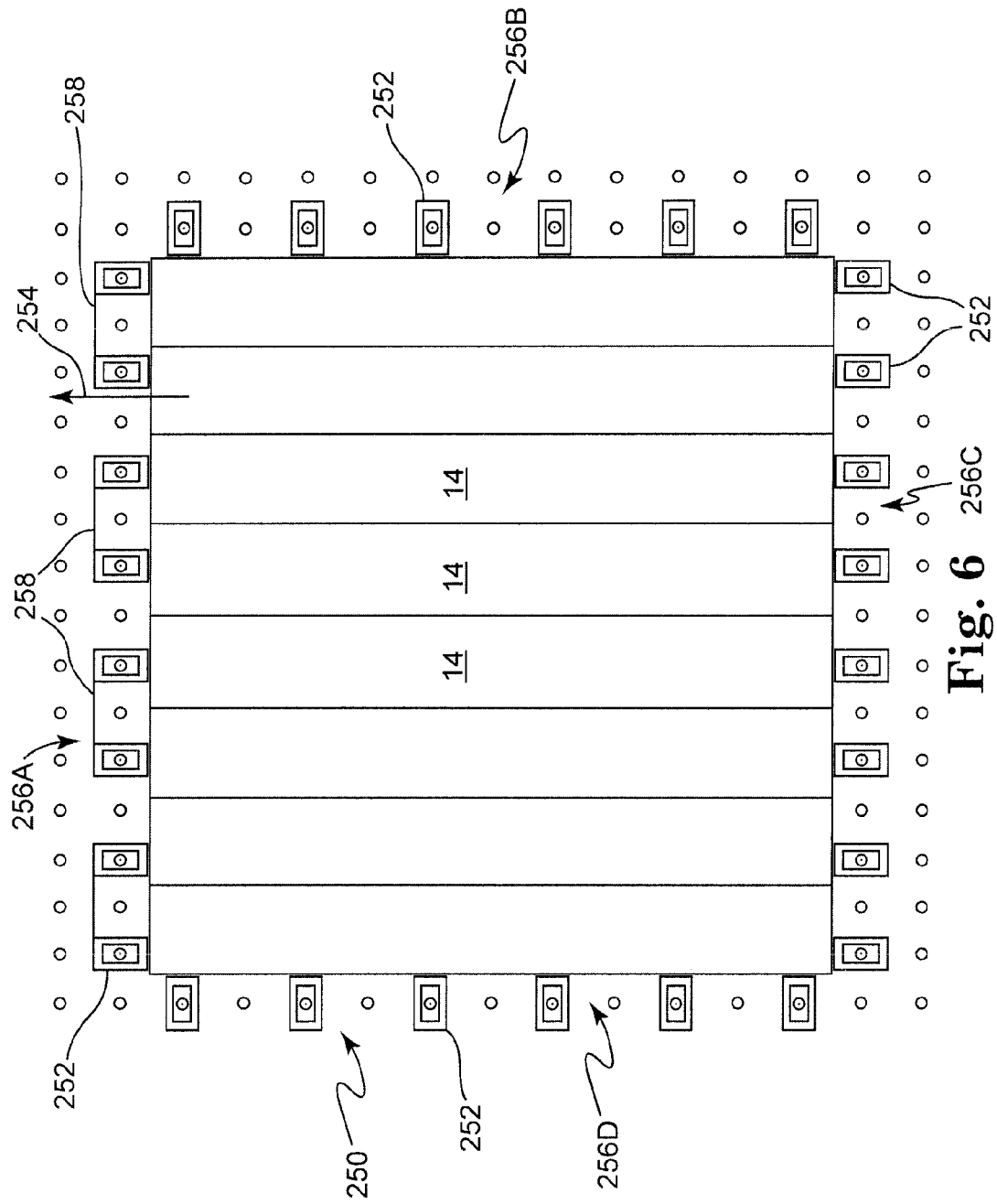
FIG. 6 is a top view of a stanchion containment system in accordance with an embodiment of the present invention.

FIG. 1 is a perspective view of a stanchion containment system 10 in accordance with an embodiment of the invention. The stanchion containment system 10 includes a plurality of assemblies 22, 24 positioned in front of the open ends of containers 14. The embodiment of FIG. 1, the stanchion containment system 10 are arranged in a generally planar configuration, that is used in combination with other structures, such as for example walls, bulkheads, and the like. Alternatively, the stanchion assemblies 22, 24 can be configured to create an enclosure, such as for example the four-sided enclosure 250, such as illustrated in FIG. 6.

Each stanchion 12 includes a ceiling assembly 30 and deck assembly 28, discussed in greater detail in connection with FIGS. 4 and 5, that permit the stanchion assemblies 22, 24 to be removable secured to holes 20 in the ceiling plate 16 and deck plate 18. Deck assembly 28 is configured for engaging one of a plurality of holes 20 in deck plate 18 for securing the stanchion assemblies 22, 24 at their bottom ends to the deck plate 18. Similarly, ceiling assembly 30 is configured for engaging one of a plurality of holes in ceiling plate 16 to secure the stanchion assemblies 22, 24 at their top ends to ceiling plate 16. The stanchion assemblies 22, 24 are preferably substantially orthogonal with respect to the ceiling plate 16 and the deck plate 18. The stanchions 12 of FIG. 1 are tube-type stanchions, although the deck assembly 28 and ceiling assembly 30 can be used with a variety of other stanchion types, such as for example H-type stanchions.

Adjacent stanchion assemblies 22 and 24 are optionally interconnected to one another by at least one linkage assembly 26. The ceiling assembly 30 and deck assembly 28 on the stanchion assembly 22 or 24 are disengaged from the ceiling plate 16 and deck plate 18, respectively. A substantial portion of the weight of the disengaged stanchion assembly 22 is transferred by the interconnecting linkage assembly 26 to the adjacent stanchion assembly 24, which remains engaged with the deck plate 18 and ceiling plate 16. As such, the disengaged stanchion 22 can be translated horizontally to expose one or more of the containers 14.

Figure 2:
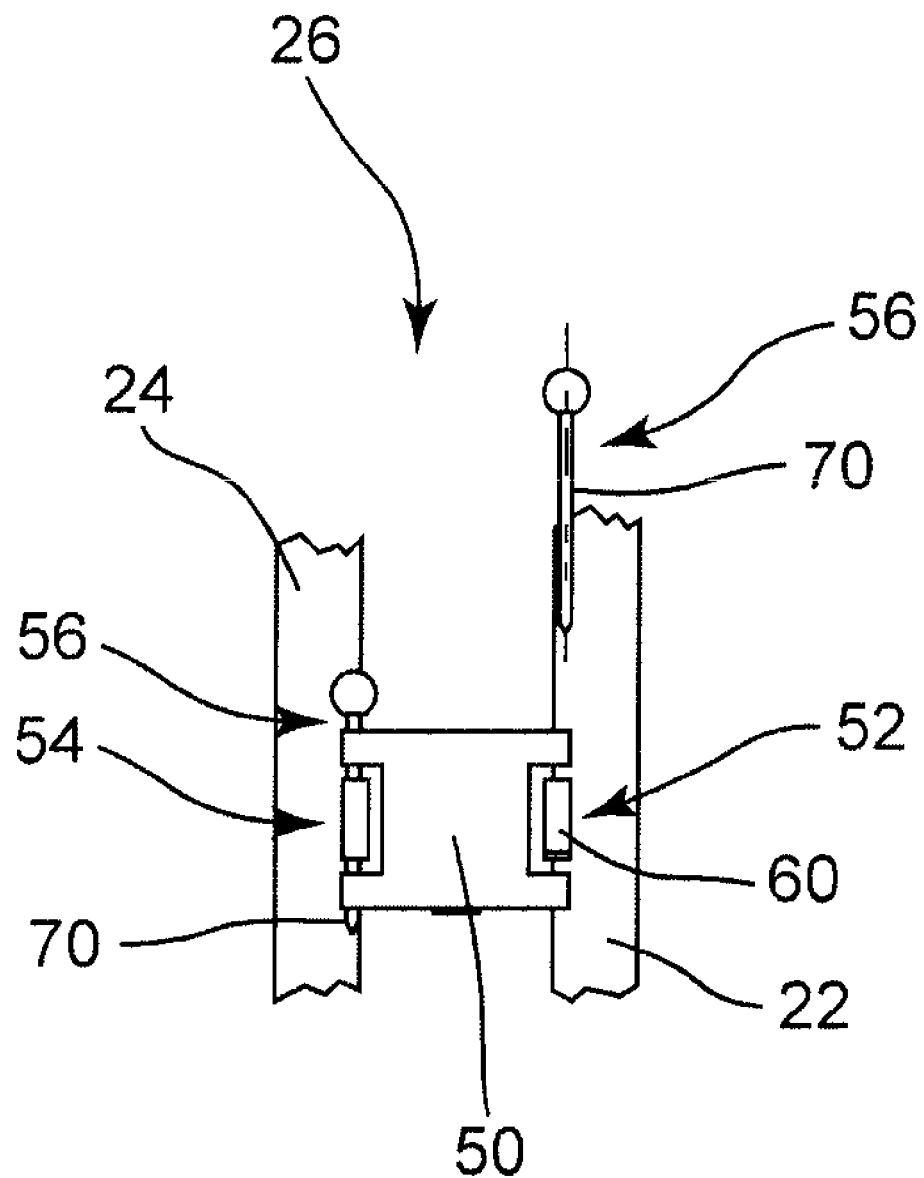
FIG. 2 is a side view of a linkage system in accordance with an embodiment of the present invention.

FIG. 2 is a detailed illustration of linkage assembly 26 in accordance with an embodiment of the present invention. The linkage assembly 26 of FIG. 2 includes connector plate 50, hinge plates 52 and 54, and two quick release pins 56. Hinge plates 52 and 54 are attached to adjacent stanchion assemblies 22 and 24, preferably on the side surfaces facing one another.

Figure 3A:
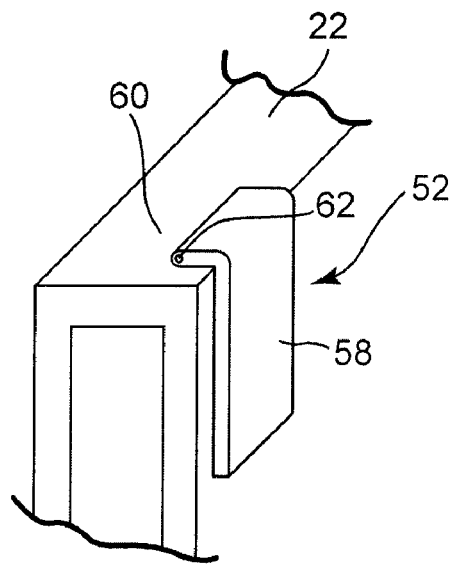
FIG. 3A is a top view of a hinge plate attached to a side surface of a stanchion assembly in accordance with an embodiment of the present invention.

As perhaps best seen in FIG. 3A, hinge plate 52 attached to a side surface of stanchion assembly 22 includes planar plate section 58 with hollow cylinder 60. Opening 62 extending through hollow cylinder 60 is configured to readily accept a pin, such as quick release pin 56. Opening 62 provides sufficient freedom for the rotational movement of the pin 56 when placed in the opening 62 for the rotational movement of hinge plate 52 around an axis of the pin 56. Hinge plate 54 is the same as or substantially similar to hinge plate 52.

Figure 3B:
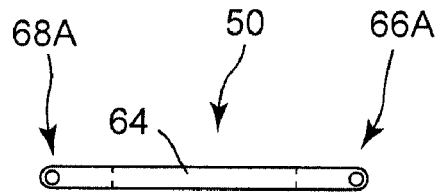
FIGS. 3B and 3C are respectively top and front views of a connector plate in accordance with an embodiment of the present invention.
Figure 3C:
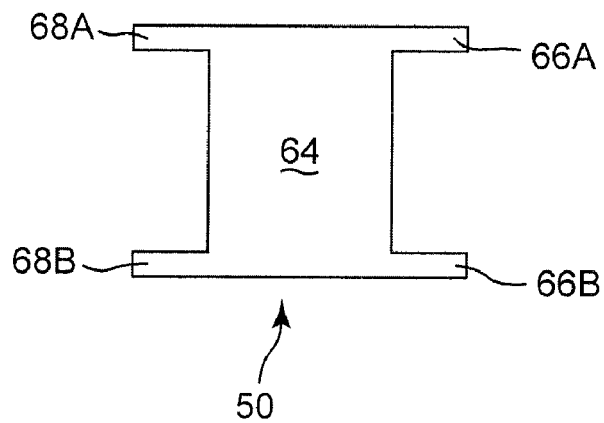

The configuration of connector plate 50 is best described with reference to FIGS. 3B and 3C. In the embodiment of FIGS. 3B and 3C, the connector plate is generally I-shaped. Connector plate 50 is shown having generally planar plate section 64 with aligned hollow cylinders 66A and 66B, respectively, at the top and bottom right corner edges of plate section 64, and aligned hollow cylinders 68A and 68B, respectively, at the top and bottom left corner edges of plate section 64. The openings through aligned hollow cylinders 66A, 66B and 68A, 68B, are also aligned with one another.

As with opening 62, the aligned openings through right hollow cylinders 66A and 66B of connecting plate 50 are configured to readily accept a pin, such as quick release pin 56. As such, the aligned openings through right hollow cylinders 66A and 66B provide sufficient freedom for the rotational movement of the pin 56 for the rotational movement of connector plate 50 with respect to the hinge plates 52, 54. The aligned openings through the hollow cylinders 68A, 68B are preferably substantially the same as the hollow cylinders 66A, 66B.

Returning to FIG. 2, hinge plate 52 is shown attached to stanchion assembly 22 on the side facing adjacent stanchion assembly 24, and likewise, hinge plate 54 is shown attached to stanchion assembly 24 on the side facing adjacent stanchion 22. Hinge plates 52 and 54 are attached at approximately the same height. Linkage assembly 26 interconnecting adjacent stanchion assemblies 22 and 24 is shown formed by rotatably attaching connector plate 50 to hinge plates 52 and 54 on stanchion assemblies 22 and 24, respectively, using pins 56.

Hollow cylinders 66A and 66B of connector plate 50 are positioned around hollow cylinder 60 of hinge plate 52 such that the openings through each hollow cylinder 62, 66A, and 66B are aligned with one another. Connector plate 50 and hinge plate 52 are then rotatably connected to one another by passing the shank of a pin, such as shank 70 of quick release pin 56, through the aligned openings of hollow cylinders 60, 66A, and 66B. Similarly, connector plate 50 is rotatably connected to hinge plate 54 by placing hollow cylinders 68A and 68B of connector plate 50 around the hollow cylinder of hinge plate 54 such that the openings through each hollow cylinder are aligned with one another. Connector plate 50 and hinge plate 54 are then rotatably connected to one another by passing the shank of a pin, such as shank 70 of quick release pin 56, through the aligned openings of the hollow cylinders.

Figure 4C:
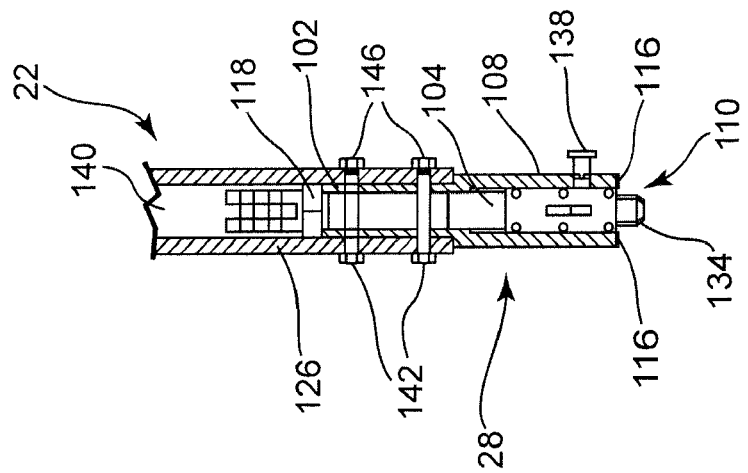
FIG. 4C is a side sectional view of another side of the deck assembly of FIG. 4B.
Figure 4B:
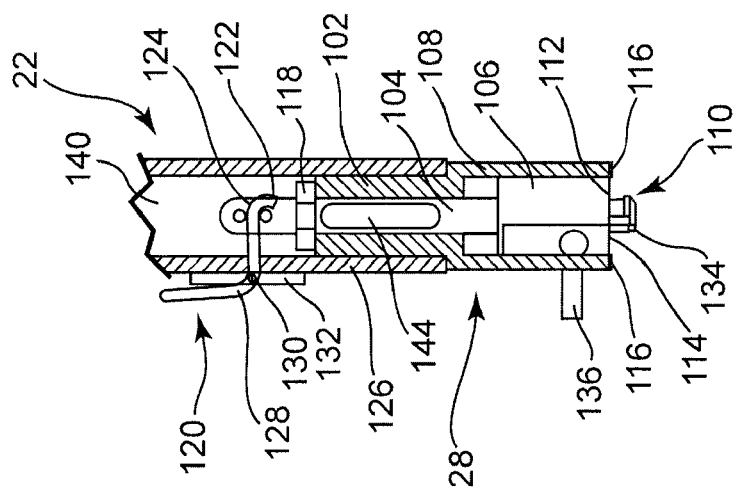
FIG. 4B is a side sectional view of the deck assembly showing the latch in an extended position for engagement in accordance with an embodiment of the present invention.
Figure 4A:
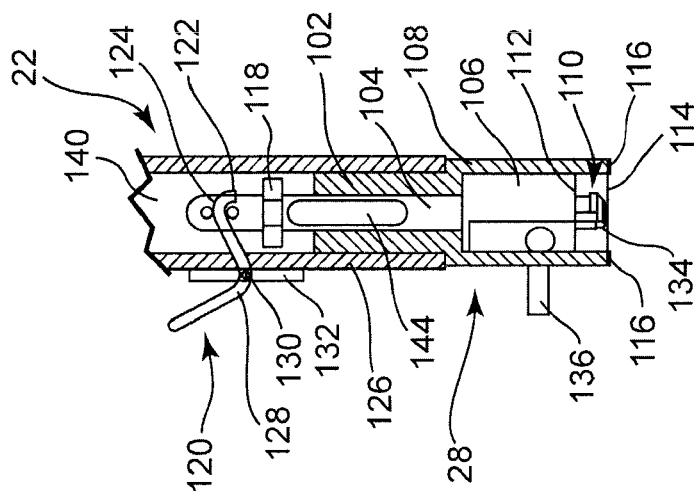
FIG. 4A is a side sectional view of the deck assembly showing the latch in the retracted position in accordance with an embodiment of the present invention.

FIGS. 4A through 4C are side views of deck assembly 28 securely fastened to the bottom end stanchion assembly 22. FIGS. 4A-4C illustrate tube-type stanchions.

FIG. 4A shows deck assembly 28 when stanchion assembly 22 is disengaged from deck plate 18, and FIGS. 4B and 4C show deck assembly 28 when stanchion assembly 22 is secured to deck plate 18. FIGS. 4A and 4B are shown as viewed from an adjacent stanchion and FIG. 4C is shown as viewed from the front of a stanchion.

In the embodiment of FIGS. 4A-4C, deck assembly 28 includes hollow upper body 102 housing slidable latch shank 104 which, at its bottom end, includes slidable latch block 106 housed in hollow lower body 108. Latch block 106 includes latch 110 extending out from the plane of bottom surface 112. The combination of latch shank 104, latch block 106, and latch 110 operate in unison such that the raising or lowering of latch shank 104 also raises and lower both latch block 106 and latch 110. In accordance with an embodiment of the invention, latch shank 104, latch block 106, and latch 110 are formed as a single piece.

The inside dimensions of hollow upper body 102 and hollow lower body 108 are engineered such that when latch 110 is in the fully retracted position as shown in FIG. 4A, latch block 106 abuts against the bottom end of hollow upper body 102 and can not extend further into hollow upper body 102. Furthermore, in the fully retracted position, latch 110 is substantially housed within the bottom portion of hollow lower body 108. Preferably, no portion of latch 110 extends out through opening 114 at the bottom of hollow lower body 108. The bottom surfaces of hollow lower body 108 at opening 114 include slide plate 116 made of a material, such as nylon, to facilitate sliding movement of deck assembly 28 along deck plate 18.

Latch shank 104 also includes stop collar 118 such that when latch 110 is in the fully extended position as shown in FIG. 4B, stop collar 118 abuts against the top end of hollow upper body 102 stopping bottom surface 112 of latch block 106 from extending out of the plane of opening 114 at the bottom of hollow lower body 108.

Deck assembly 28 further includes extend/retract lever 120 in a shape somewhat similar to an "S". End 122 of extend/retract lever 120 includes orthogonal bend 124 connected to latch shank 104 at a short distance from the end of latch shank 104. Extend/retract lever 120 extends from latch shank 104 out through a side of stanchion body 126 and forms orthogonal bend 128. Lever pivot pin 130 attaches orthogonal bend 128 to lever mounting plate 132 fixedly attached to the side of stanchion body 126.

Extend/retract lever 120 preferably extends a reasonable length beyond orthogonal bend 128 so as to provide a good hand grip for the operator and to provide a substantial leverage force for raising and lowering latch 110. In operation, pulling extend/retract lever 120 away from the stanchion body 126 will move latch shank 104 in the upward direction pulling latch 110 out of latch hole 20 in deck plate 18. And, pushing extend/retract lever 120 towards the stanchion body 126 will move latch shank 104 in the downward direction pushing latch 110 into latch hole 20 in deck plate 18.

Latch 110 includes wedge 134 mechanically connected to latch/unlatch lever 136 extending out of a side of hollow lower body 108. Wedge 134 is configured for radial expansion in response to moving latch/unlatch lever 136 in the downward direction to the latch position, and for radial contraction in response to moving latch/unlatch lever 136 in the upward direction to the unlatch position.

In operation, when latch 110 is fully extended into latch hole 20, moving latch/unlatch lever 136 downwards to the latch position mechanically expands wedge 134 in the radial direction so as to securely engage latch 110 to the walls of latch hole 20. When latch 110 needs to be removed from latch hole 20, latch/unlatch lever 136 is moved upwards to the unlatch position causing wedge 134 to mechanically contract in the radial direction disengaging latch 110 from the walls of latch hole 20. In order to prevent accidental movement of latch/unlatch lever 136, latch detent 138 is provided to mechanically engage latch/unlatch lever 136 such that latch detent 138 must always first disengage latch/unlatch lever 136 before it can be moved from the latch to the unlatch position, or vice versa.

Deck assembly 28 is preferably fixedly attached to stanchion body 126 by first placing hollow upper body 102 of deck assembly 28 in its entirety inside hollow core 140 of stanchion assembly 22. As shown in FIG. 4C, bolts 142 passing through the walls of both stanchion assemblies 22, 24 and hollow upper body 102 housed within stanchion 22 and extending through opening 144 in latch shank 104 are used with nuts 146 for securing deck assembly 28 to the bottom end of stanchion assembly 22.

Figure 5A:
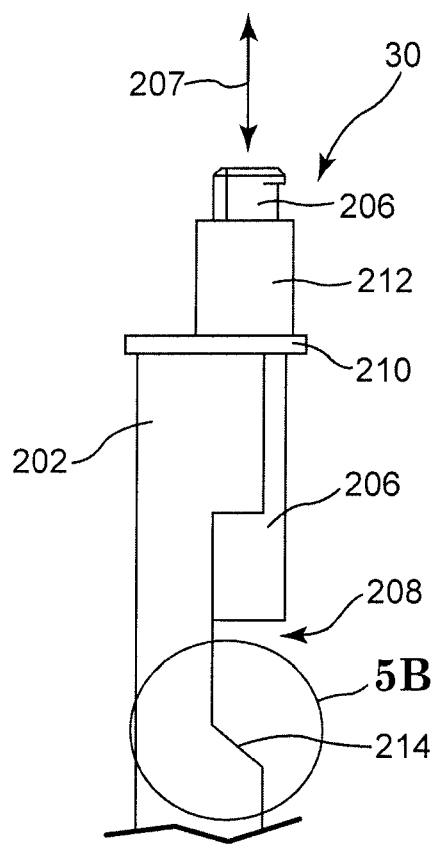
FIG. 5A is a side view of a ceiling assembly at the top end of a stanchion assembly in accordance with an embodiment of the present invention.
Figure 5B:
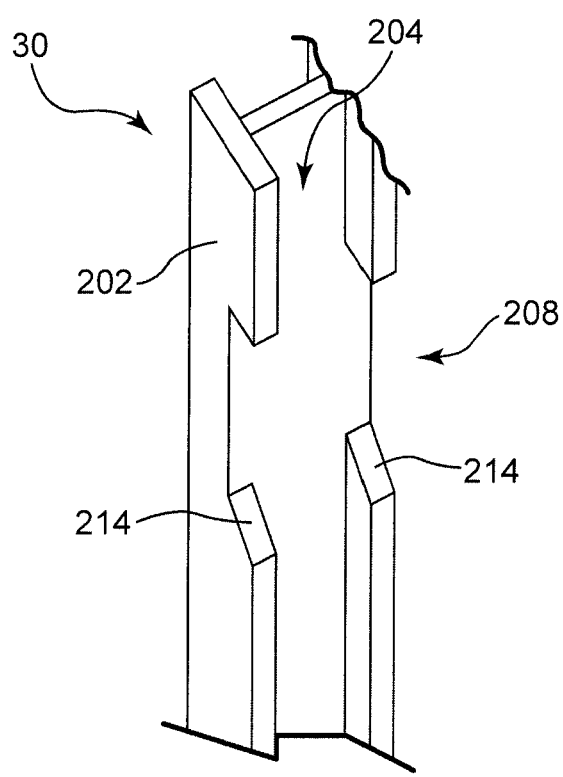
FIG. 5B is a perspective view of the pinch/crush relief design used in the ceiling assembly of FIG. 5A.

FIG. 5A is a side view of ceiling assembly 30 at the top end of a stanchion assembly 22. As shown in FIG. 5B, ceiling assembly 30 includes body 202 having channel 204 for housing plunger 206 (FIG. 5A) and opening 208 for facilitating the extension and retraction of plunger 206 along axis 207. The top end of body 202 optionally includes resilient pad 210 and fitting 212 having a plunger locking mechanism for locking plunger 206 in place. FIGS. 5A and 5B illustrate H-type stanchions.

Plunger 206 is housed in channel 204 and optionally extends through resilient pad 210 and fitting 212. For securing the stanchion at its top end to ceiling plate 16, the bottom end of plunger 206 is pushed upwards along axis 207 in channel 204 so as to extend the top end of plunger 206 out of and above the plane of fitting 212 and into a latch hole in ceiling plate 16. The plunger locking mechanism within fitting 212 is then engaged to hold plunger 206 in place with the top end within the latch hole. For releasing the stanchion from ceiling plate 16, the plunger locking mechanism within fitting 212 is disengaged permitting plunger 206 to fall down in channel 204 under gravitational pull. As perhaps best shown in FIG. 5B, bottom end 214 of opening 208 is formed at an angle to provide relief from pinching and/or crushing as plunger 206 falls within channel 204.

FIG. 6 illustrates a top view of a four-sided stanchion containment system 250 wherein the stanchion assemblies 252 form an enclosure in accordance with an embodiment of the present invention. In the embodiment of FIG. 6, the containers 14 are removed along axis 254 located at side 256A of the enclosure 250. Consequently, sides 256B, 256C, and 256D do not require linkage assemblies 258. Alternatively, linkage assemblies 258 can be attached to stanchion assemblies 252 along any of the sides 256B, 256C, and 256D.

Figure 7A:
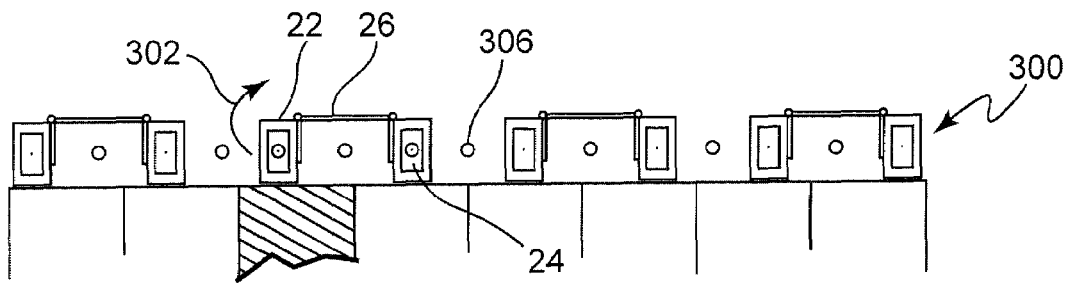
FIGS. 7A-7D illustrate the movement sequence of a stanchion assembly in accordance with one embodiment of the present invention.
Figure 7B:
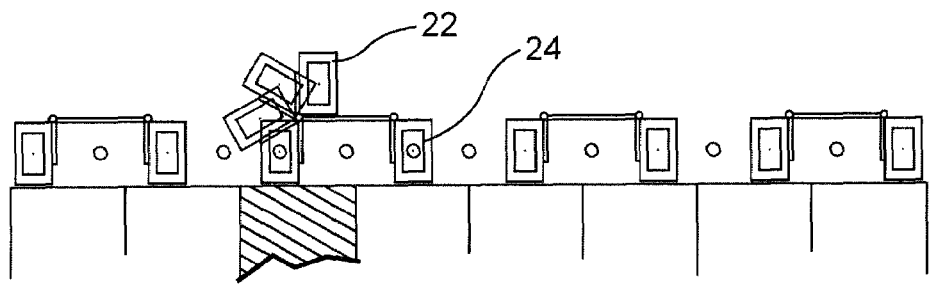
Figure 7C:
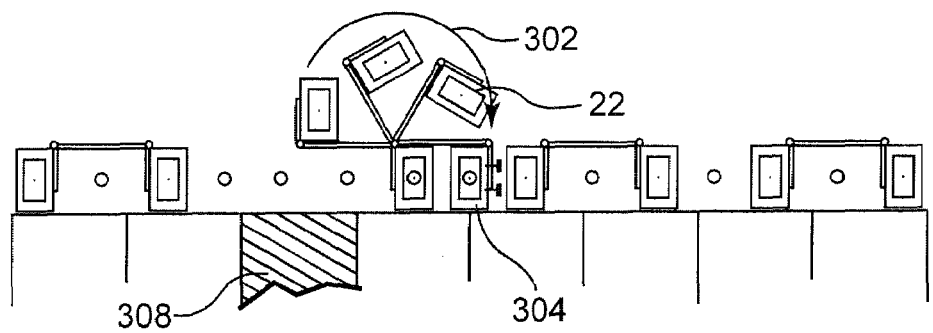
Figure 7D:
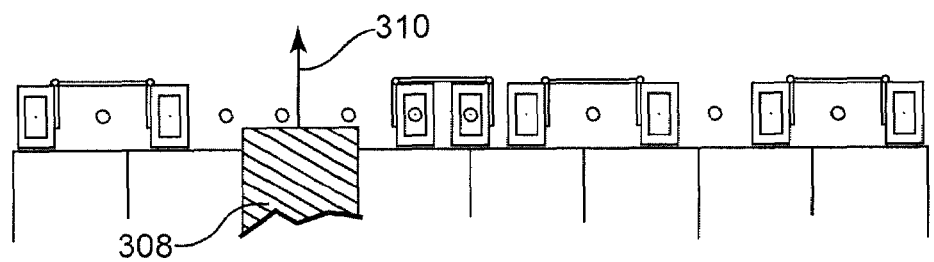

FIGS. 7A-7D illustrate operation of the stanchion assembly 300 in accordance with an embodiment of the present invention. Ceiling assembly 30 and deck assembly 28 are disengaged from the ceiling plate 16 and the deck plate 18 (see FIG. 1), respectively. FIGS. 7A-C illustrates a movement sequence along path 302 for stanchion assembly 22. Throughout movement along the path 302, the stanchion assembly 24 and the linkage assembly 26 support the weight of the stanchion assembly 22. Once the stanchion assembly 22 is in location 304, illustrated in FIG. 7D, the deck assembly 28 is engaged with holes 306 in the deck plate 28. The ceiling assembly 30 is optionally engaged with the corresponding hole in the ceiling plate 16. Container 308 can now be accessed along axis 310 and the stanchion assembly 22 is secured (as are the remainder of the containers 14).

FIGS. 8A and 8B illustrate alternate stanchion containment system 50 in accordance with an embodiment of the present invention. Linkage assembly 352 includes three pivot axes 354A, 354B and 354C. FIG. 8B illustrates stanchion assembly 356 laterally or horizontally displaced by rotation around axis 354B, exposing container 14A. The three pivot axes 354A, 354B and 354C permit the stanchion assembly 356 to be laterally displaced along a circular or non-circular path, such as for example along a straight line or random curvilinear path.

Figure 8C:
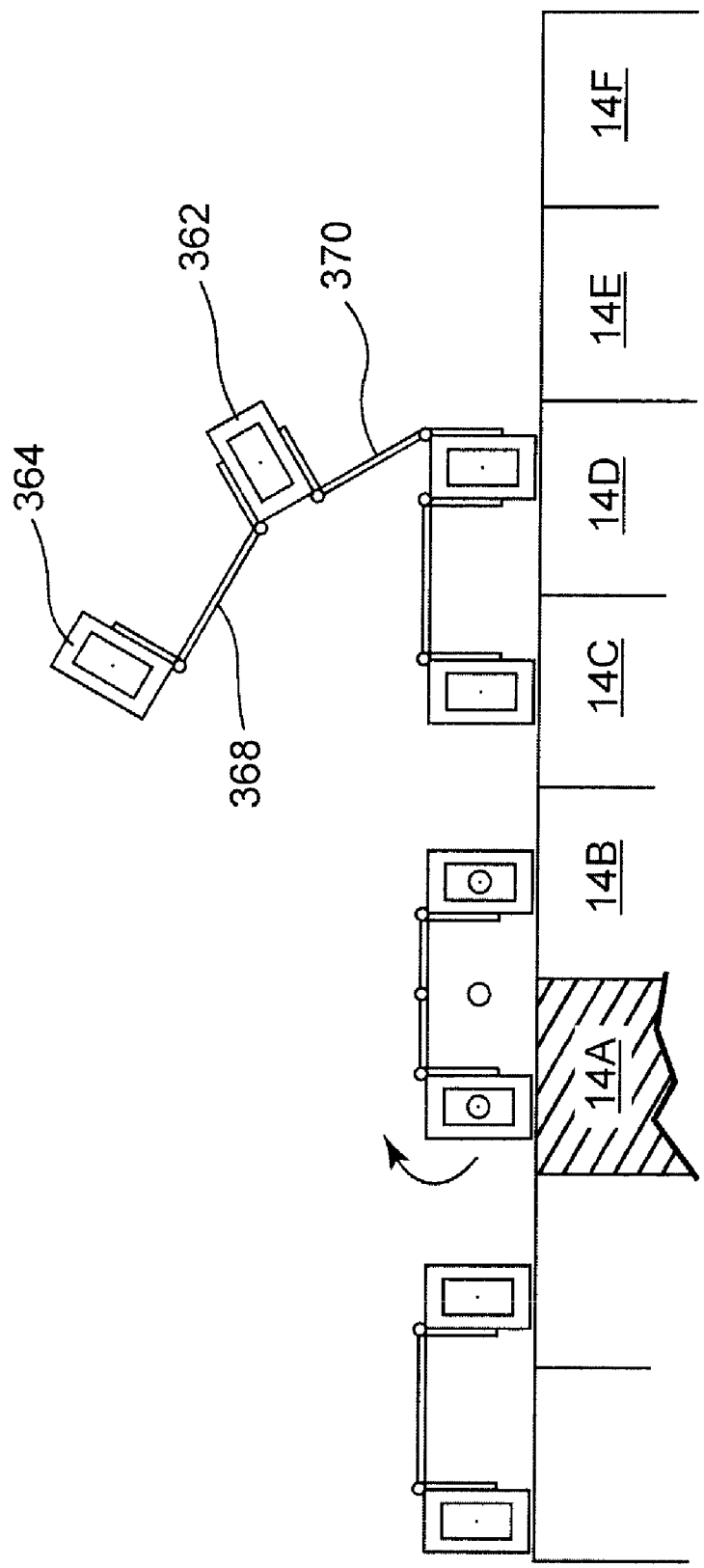
FIG. 8C illustrates the stanchion containment system of FIG. 8A in an alternate open configuration in accordance with an embodiment of the present invention.

Stanchion assemblies 358, 360, 362, and 364 are connected by linkage assemblies 366, 368, 370, respectively. FIG. 8B, illustrates one embodiment for displacing stanchion assemblies 358, 364, exposing containers 14C and 14F. FIG. 8C illustrate an alternate embodiment in which stanchion assemblies 362 and 364 are both displaced horizontally while being supported by linkage assemblies 368 and 370, exposing containers 14E and 14F.

Many of the features of the various embodiments can be combined with features from other embodiments. For example, the stanchion assemblies can be arranged in a variety of configurations. It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A stanchion containment system comprising:
    a ceiling plate with a plurality of holes;
    a deck plate with a plurality of holes generally aligned vertically with holes in the ceiling plate;
    at least first, second and third stanchion assemblies arranged generally adjacent to each other in a plane to comprise a portion of a perimeter of an enclosure, the second stanchion assembly located between the first and third stanchion assemblies, each of the stanchion assemblies comprising a ceiling assembly adapted to releasably engage with the holes in the ceiling plate, and a deck assembly adapted to releasably engage with the holes in the deck plate; and
    at least one linkage assembly connecting at least the first and second stanchion assemblies in a hinged relationship, the linkage assembly and the first stanchion assembly support the second stanchion assembly during displacement of the second stanchion assembly from a location in the plane to a location outside the plane, and the linkage assembly and the second stanchion assembly support the first stanchion assembly during displacement of the first stanchion assembly from a location in the plane to a location outside the plane.

2. The stanchion containment system of claim 1 wherein the linkage assembly and the first stanchion assembly support the second stanchion assembly above the deck plate during displacement.

3. The stanchion containment system of claim 1 wherein the linkage assembly and the first stanchion assembly support the second stanchion assembly above the deck plate when the ceiling assembly and deck assembly of the second stanchion assembly are disengaged from the holes in the ceiling plate and deck plate.

4. The stanchion containment system of claim 1 wherein at least one stanchion assembly is displaced along one or more of a generally circular path, a curvilinear path or a linear path.

5. The stanchion containment system of claim 1 wherein a displace stanchion assembly is engaged with the holes in the ceiling plate and the deck plate when located outside the plane.

6. The stanchion containment system of claim 1 wherein at least two stanchion assemblies are displaced.

7. The stanchion containment system of claim 1 wherein the linkage assembly supports at least two horizontally displaced stanchion assemblies simultaneously.

8. The stanchion containment system of claim 1 wherein the hinged connection comprises at least one removable pivot pin.

9. The stanchion containment system of claim 1 wherein the linkage assembly comprises at least one pivot axis on each of two adjacent stanchion assemblies.

10. The stanchion containment system of claim 1 comprising:
    a first linkage assembly connecting the first stanchion assembly to the second stanchion assembly; and
    a second linkage assembly connecting the second stanchion assembly to the third stanchion assembly.

11. The stanchion containment system of claim 1 comprising:

a first linkage assembly connecting the first stanchion assembly to the second stanchion assembly; and a second linkage assembly connecting the third stanchion assembly to a fourth stanchion assembly.

12. The stanchion containment system of claim 1 wherein the linkage assembly is detachable from at least one of the stanchion assemblies.

13. The stanchion containment system of claim 1 wherein the stanchion assemblies are substantially orthogonal to the ceiling and deck plates.

14. A stanchion containment system anchored to a ceiling plate and a deck plate, the stanchion containment system comprising:

at least first, second and third stanchion assemblies arranged generally adjacent to each other in a plane to comprise a portion of a perimeter of an enclosure, the second stanchion assembly located between the first and third stanchion assemblies, each of the stanchion assemblies comprising a ceiling assembly adapted to releasably engage with holes in the ceiling plate, and a deck assembly adapted to releasably engage with holes in the deck plate; and at least one linkage assembly connecting at least the first and second stanchion assemblies in a hinged relationship, the linkage assembly and the first stanchion assembly supporting the second stanchion assembly during displacement of the second stanchion assembly from a location in the plane to a location outside the plane, and the linkage assembly and the second stanchion assembly supporting the first stanchion assembly during displacement of the first stanchion assembly from a location in the plane to a location outside the plane.

15. The stanchion containment system of claim 14 wherein the linkage assembly and the first stanchion assembly support the second stanchion assembly above the deck plate during displacement.

16. The stanchion containment system of claim 14 wherein the linkage assembly and the first stanchion assembly support the second stanchion assembly above the deck plate when the ceiling assembly and deck assembly of the second stanchion assembly are disengaged from the holes in the ceiling plate and deck plate.

17. The stanchion containment system of claim 14 wherein the linkage assembly comprises at least one pivot axis on each of two adjacent stanchion assemblies.

18. The stanchion containment system of claim 14 comprising:

a first linkage assembly connecting the first stanchion assembly to the second stanchion assembly; and a second linkage assembly connecting the second stanchion assembly to the third stanchion assembly.

19. The stanchion containment system of claim 14 comprising:

a first linkage assembly connecting the first stanchion assembly to the second stanchion assembly; and a second linkage assembly connecting the third stanchion assembly to a fourth stanchion assembly.

20. A method for anchoring a stanchion containment system between a ceiling plate and a deck plate, the method comprising the steps of:

arranging at least first, second and third stanchion assemblies generally adjacent to each other in a plane to comprise a portion of a perimeter of an enclosure;

releasably engaging ceiling assemblies and deck assemblies on the first, second and third stanchion assemblies with holes in the ceiling plate and the deck plate, respectively;

connecting at least one linkage assembly to at least the first and second stanchion assemblies in a hinged relationship, the linkage assembly and the first stanchion assembly supporting the second stanchion assembly during displacement of the second stanchion assembly from a location in the plane to a location outside the plane; and supporting the first stanchion assembly by the second stanchion assembly during displacement of the first stanchion assembly from a location in the plane to a location outside the plane.

21. The method of claim 20 comprising the step of supporting the second stanchion assembly above the deck plate during displacement.

22. The method of claim 20 comprising the step of connecting the second stanchion assembly to the third stanchion assembly with a second linkage system.

23. The method of claim 20 comprising the step of connecting the third stanchion assembly to a fourth stanchion assembly with a second linkage system.

* * * * *